United States Patent
Mori et al.

(10) Patent No.: US 6,730,710 B2
(45) Date of Patent: May 4, 2004

(54) RUBBER COMPOSITION FOR TIRE AND PROCESS OF PRODUCTION THEREOF

(75) Inventors: Makio Mori, Hiratsuka (JP); Takeshi Hotaka, Hiratsuka (JP); Takashi Shirokawa, Hiratsuka (JP)

(73) Assignee: The Yokohama Rubber Co, Ltd., Tokyo (JP)

( * ) Notice: Subject to any disclaimer, the term of this patent is extended or adjusted under 35 U.S.C. 154(b) by 95 days.

(21) Appl. No.: 10/310,881

(22) Filed: Dec. 6, 2002

(65) Prior Publication Data
US 2003/0119927 A1 Jun. 26, 2003

(30) Foreign Application Priority Data
Dec. 14, 2001 (JP) ........................................ 2001-381703

(51) Int. Cl.⁷ .................................................. C08J 9/32
(52) U.S. Cl. ........................ 521/54; 521/150; 523/218; 523/219
(58) Field of Search .................. 521/54, 150; 523/218, 523/219

(56) References Cited
FOREIGN PATENT DOCUMENTS

| | | | |
|---|---|---|---|
| JP | 60-258235 A1 | 12/1985 |
| JP | 62-283001 A1 | 12/1987 |
| JP | 2-170840 A1 | 7/1990 |
| JP | 2-208336 A1 | 8/1990 |
| JP | 2-274740 A1 | 11/1990 |
| JP | 2-281051 A1 | 11/1990 |
| JP | 8-003373 A1 | 1/1996 |
| JP | 9-302153 A1 | 11/1997 |
| JP | 11-035736 A1 | 2/1999 |
| JP | 2000-044732 A1 | 2/2000 |
| JP | 2001-072802 A1 | 3/2001 |
| JP | 2001-279020 A1 | 10/2001 |

*Primary Examiner*—Morton Foelak
(74) *Attorney, Agent, or Firm*—Rader Fishman & Grauer

(57) ABSTRACT

A rubber composition comprising 100 parts by weight of a diene rubber and 0.5 to 20 parts by weight of a foaming agent-containing resin containing 5 to 65% by weight of a chemical foaming agent, wherein the resin is mainly a polyolefin resin which is not co-crosslinkable with the diene rubber and wherein the rubber composition is structured having microcapsule-shaped bubbles coated with a resin layer after vulcanization of the rubber.

5 Claims, No Drawings

RUBBER COMPOSITION FOR TIRE AND PROCESS OF PRODUCTION THEREOF

BACKGROUND OF THE INVENTION

1. Field of the Invention

The present invention relates to a rubber composition having a superior friction performance on ice, which is suitable for use especially for a tire tread and can be obtained by compounding, into a diene rubber, a foaming (or blowing) agent-containing resin having a resin ingredient mainly composed of a polyolefin resin which is not crosslinkable with a diene rubber, and also relates to a process for production thereof.

2. Description of Related Art

Numerous methods are being studied for improving the frictional force on the ice. For example, a hard foreign matter (e.g., see Japanese Unexamined Patent Publication (Kokai) No. 60-258235, Japanese Unexamined Patent Publication (Kokai) No. 2-274740, Japanese Unexamined Patent Publication (Kokai) No. 2-281051, etc.), a foaming agent (e.g., see Japanese Unexamined Patent Publication (Kokai) No. 62-283001), a porous substance (e.g., see Japanese Unexamined Patent Publication (Kokai) No. 8-003373, Japanese Unexamined Patent Publication (Kokai) No. 9-302153, Japanese Unexamined Patent Publication (Kokai) No. 10-973614, Japanese Unexamined Patent Publication (Kokai) No. 2000-044732, Japanese Unexamined Patent Publication (Kokai) No. 2001-072802, etc.), hollow particulates (e.g., see Japanese Unexamined Patent Publication (Kokai) No. 2-170840, Japanese Unexamined Patent Publication (Kokai) No. 2-208336, Japanese Unexamined Patent Publication (Kokai) No. 11-35736, etc.), or expandable graphite (e.g., see Japanese Unexamined Patent Publication (Kokai) No. 2001-279020) are compounded into a rubber to form microroughness (or microrelief) on the surface of the rubber after vulcanization, whereby the film (or micro layer) of water generating on the contact surface of rubber and ice is removed.

Among these methods, the simplest method capable of forming the desired surface roughness by formation of relatively large spherical voids inside the rubber is the compounding of the above-mentioned hollow particulates. According to this method, not only the micro film (or layer) of water between the rubber and ice can be removed by the formation of roughness on the rubber surface, but also the frictional force on ice can be improved by the ice scraping effect of the shell-like substance of the spheres exposed at the rubber surface. Further, since the reinforcing effect on the rubber matrix is derived from the shells possessed by the spheres, there is no drop in rigidity of the rubber matrix due to the occurrence of voids inside the rubber. However, this method has the disadvantage that the hollow particulates are destroyed by the shear force generating inside the rubber during the mixing and extrusion steps of the rubber. To prevent the destruction at these processing steps, the size of the hollow particulates has to be made sufficiently small. However, if this is done, the size of the hollow particulates inside the rubber after vulcanization also becomes smaller and, as a result, there is the problem that sufficient surface roughness cannot be formed. In the case of thermally expansible hollow particulates, since the hollow bodies are fine particles, before expansion the particles are not destroyed during the processing if the ingredients are designed to expand at curing stage. During the vulcanization, the particles expand and grow in size, and therefore surface roughness suitable for removing the micro film (or layer) of water between the rubber and the ice is formed. However, since a low boiling point hydrocarbon is used as the foaming agent in the temperature region above the boiling point of the hydrocarbon, even if below the melting point of the substance of the shell, the behavior of the particles becomes unstable. Therefore, all of the expansible particles compounded are difficult to expand to a desired size at the time of vulcanization. Further, with expansion by a small amount of a low boiling point hydrocarbon, the expansion pressure is not sufficient for expanding the particles inside the highly packed rubber matrix. Therefore, there are limits to the further increase of the expansion for greatly improving the frictional force on ice.

In the method of forming foams in the rubber after vulcanization by the compounding of a foaming agent, there is none of the problem of destruction of the particles during processing as with the blending of hollow particulates, it is possible to easily form spherical voids at the time of vulcanization by addition of a compounding agent of a suitable size, and the microroughness is advantageously formed on the rubber surface. Further, the foam expansion pressure with a chemical foaming agent is sufficiently large, and therefore, sufficiently large bubble-like voids can be formed in the rubber after the vulcanization. However, the bubbles obtained by compounding just a chemical foaming agent do not possess the shells surrounding the bubbles such as those shown in spherical voids obtained by compounding the above hollow particulates, and therefore, the scraping effect by the shells at the contact surface of the rubber and the ice cannot be expected. Further, since there are no shells around the bubbles, the hardness of the rubber matrix greatly falls with increase in the foaming ratio. When used for the tread part of a winter tire, there is the disadvantage that the steering stability on non-snow covered road surfaces is remarkably impaired.

Another disadvantage of a rubber composition using a foaming agent is that gas is easily escaped from the bubbles at the rubber surface contacting the vulcanization mold at the time of vulcanization and foaming, and therefore, it is not possible to form as large a number of bubbles near the surface of the vulcanized rubber as at the inside. When using such a rubber composition for a tire for an ice- and snow-covered road surface, there is the problem that the desired effect cannot be obtained until the tire is abraded to a certain extent. This type of problem can also be solved by giving shells to the foamable bubbles.

As the techniques for forming a resin-like film which acts as the role of shells around bubbles formed by a foaming agent, the compounding of a foaming agent-containing fiber (Japanese Unexamined Patent Publication (Kokai) No. 1999-60770 and Japanese Unexamined Patent Publication (Kokai) No. 2001-2832), the compounding of a foaming agent-containing water-soluble fiber (Japanese Unexamined Patent Publication (Kokai) No. 2000-191831 and Japanese Unexamined Patent Publication (Kokai) No. 2000-191832), etc. have been proposed. However, the size of the foamable bubbles is restricted by the size of the staple fibers, long foamable bubbles are difficult to be dispersed well in rubber, and it is difficult to replace the effects of ordinary compounding of a foaming agent by just this compounding alone. Further, techniques for obtaining bubble-shaped voids coated with resin films by the simultaneous compounding of a resin co-crosslinkable with a diene rubber and a foaming agent have been proposed (Japanese Unexamined Patent Publication (Kokai) No. 1997-188775 and Japanese Unexamined Patent Publication (Kokai) No. 1997-302133). However, when a resin co-crosslinkable with a rubber is compounded, the resin is diffused in the rubber molecules when heating. In a practical use, it is difficult to obtain desired resin-coated bubbles. Further, even if the resin and foaming agent are simultaneously compounded, the probability that the both components will encounter each other and merge during the mixing of the rubber is low, and therefore either resin-coated bubbles will not be formed or the thickness of the resin-coated layer formed is not enough to improve the frictional force on the ice. Thus, the scraping effect on ice as shown in the case of the presence of shells of hollow particles cannot be expected. Japanese Unexamined Patent Publication (Kokai) No. 1997-188775 and Japanese Unexamined Patent Publication (Kokai) No. 1997-302133 describe that use of a co-crosslinkabile resin with rubber can prevent detachment of the resin-coated bubbles from the surface of a vulcanized rubber and results in a scraping effect on ice. However, as explained above, a strong shell structure providing a scraping effect cannot be obtained, when the co-crosslinkability to the resin is given.

SUMMARY OF THE INVENTION

Accordingly, the object of the present invention is to provide a rubber composition for a tire achieving both of a frictional performance on ice and processability of the rubber and further suppressing a decrease in the stiffness or hardness of the vulcanized rubber and poor formation of microcapsule-shaped bubbles on the rubber surface.

In accordance with the present invention, there is provided a rubber composition comprising (i) 100 parts by weight of a diene rubber and (ii) 0.5 to 20 parts by weight of a foaming agent-containing resin containing 5 to 65% by weight of a chemical foaming agent, wherein said resin is mainly composed of a polyolefin resin which is not co-crosslinkable with a diene rubber and wherein the rubber composition is structured having microcapsule-shaped bubbles coated with a resin layer after vulcanization of the rubber.

In accordance with the present invention, there is further provided a process for producing a rubber composition comprising the steps of:

Compounding, into a diene rubber, the above-mentioned foaming agent-containing resin, mixing and extruding the mixture under a temperature condition of lower than a decomposition temperature of a chemical foaming agent, and heating the mixture at a vulcanization step under a temperature condition of at least the decomposition temperature of the chemical foaming agent to be expanded and foamed, whereby microcapsule-shaped bubbles coated with a resin layer are dispersed in the rubber.

MODE FOR CARRYING OUT THE INVENTION

In this specification and in the claims which follow, the singular forms "a", "an" and "the" include plural referents unless the context clearly dictates otherwise.

To overcome all of the above problems, the present invention, compounds, into the rubber, a foaming agent-containing resin to form microcapsule-shaped resin-coated bubbles inside the rubber without causing a large decrease in the hardness of the rubber after the vulcanization, and the removal of the micro film (or layer) of water between the rubber and the ice by the surface roughness formed on the rubber surface after abrasion and a scraping effect on the ice surface by the resin exposed at the surface together with the bubbles are simultaneously obtained, whereby the frictional force between the rubber and the ice is greatly improved. Since a foaming agent previously contained in a polyolefin resin is compounded, it is possible to select the processing temperature, without regard to the melting point of the resin, so long as it is below the decomposition temperature of the foaming agent (in Japanese Unexamined Patent Publication (Kokai) No. 1997-188775 and Japanese Unexamined Patent Publication (Kokai) No. 1997-302133, there is the limitation of selecting a condition where the resin will not melt in the processing step so that the resin will change to foam-like bubbles during vulcanization) and the coated layer of the resin around the bubbles is formed efficiently and reliably. Further, since a polyolefin resin does not have co-crosslinkability with a diene rubber, the resin layer is not unnecessarily dispersed in and crosslinked with the rubber phase (or matrix) at the time of high temperature processing or at the time of vulcanization, and the bubbles coated with microcapsule-shaped resin with clearly separated rubber phases (or matrix) and resin portion will be obtained. Further, with bubbles having improved air-tightness by the resin coating, there is resistance to escape of the gas at the mold contact surface at the time of vulcanization and, as a result, the vulcanized rubber has the property of microcapsule-shaped bubbles which are more uniformly dispersed from the surface part to the center. Tires for ice- or snow-covered road surfaces using such a rubber have the characteristic of being able to exhibit a high frictional force on the ice from the initial stage of use.

According to the present invention, 0.5 to 20 parts by weight, preferably 2 to 10 parts by weight, of a foaming agent-containing resin containing a chemical foaming agent is compounded into 100 parts by weight of a diene rubber. If the compounded amount is too small, the void forming effect is insufficient, while if too large, it is not preferable because the shape stability of the vulcanized rubber is impaired and the abrasion resistance of the rubber is remarkably impaired.

In the present invention, the resin component forming the foaming agent-containing resin should not have co-crosslinkability with a diene rubber. Specifically, the polymer composed of a polyolefin resin as a main component is used. Note that here the "main component" means the polyolefin resin is at least about 75% by weight of the total resin component. Other components include, for example, unreacted residue of an olefin monomer, residue of the polymerization initiator or catalyst, a processing agent, polymeric resin other than a polyolefin resin, etc. Such a foaming agent-containing resin is available as, for example, "Cellpowder" from Eiwa Chemical. The rubber composition for tire use of the present invention may further contain an ordinary vulcanization or cross-linking agent, a vulcanization or cross-linking accelerator, various types of oils, an antiaging agent, a filler, a plasticizer, and other various types of additives generally used in rubber compositions. Such components may be mixed and vulcanized by a general method to form a composition which is then vulcanized or cross-linked. The amounts of these additives may also be made the generally compounded amounts so long as the object of the present invention is not impaired.

The content of the chemical foaming agent in the foaming agent-containing resin according to the present invention is 5 to 65% by weight, preferably 15 to 50% by weight. If the amount is too small, the void forming effect is liable to become insufficient, while if too large, the thickness of the shells formed becomes thin and the scraping effect of the microcapsules is liable to become insufficient.

In a preferable embodiment of the present invention, in addition to the foaming agent-containing resin, 0.5 to 20 parts by weight, preferably 2 to 5 parts by weight, of thermally expansible microcapsules composed of a gas-filled thermoplastic resin expansible by heat is used based upon 100 parts of a diene rubber. By the compounding of the thermally expansible microcapsules, it is possible to give a broad distribution to the size of the microcapsules in the vulcanized rubber and, as a result, the efficiency of the elimination effect of the micro film of water between the rubber and ice can be further improved.

The thermally expansible microcapsules usable in the present invention are thermally expansible thermoplastic resin particles containing a liquid which vaporizes by heat to generate a gas enclosed in a thermoplastic resin. The microcapsules expand by heating at a temperature of at least the expansion starting temperature, normally a temperature of 140 to 190° C., to form microcapsules with gas filled in a shell composed of the thermoplastic resin. The particle size of the thermally expansible thermoplastic resin particles is preferably 5 to 300 μm, more preferably 10 to 200 μm.

Such thermally expansible microcapsules (or thermally expansible thermoplastic resin particles) are, for example, currently available as the commercial products named "Expancel 091DU-80" or "Expancel 092DU-120" etc. from Expancel Co. (Sweden) or the commercial products named "Matsumoto Microspheres F-85" or "Matsumoto Microspheres F-100" etc. from Matsumoto Yushi Co. (Japan).

The thermoplastic resin forming the shell ingredient of the gas-filled thermoplastic resin particles may preferably include those having an expansion starting temperature of at least 100° C., preferably at least 120° C., and a maximum expansion temperature of at least 150° C., preferably at least 160° C. Examples of such a thermoplastic resin are a polymer of (meth)acrylonitrile or a copolymer having a high (meth)acrylonitrile content. Another monomer (or comonomer) in the case of a copolymer may include vinyl halides, vinylidene halides, a styrene-based monomer, a (meth)acrylate-based monomer, vinyl acetate, butadiene, vinylpyridine, chloroprene, etc. Note that the above thermoplastic resin may be made crosslinkable by a crosslinking agent such as divinylbenzene, ethyleneglycol (meth)acrylate, triethyleneglycol di(meth)acrylate, trimethylolpropane tri(meth)acrylate, 1,3-butyleneglycol di(meth)acrylate, allyl(meth)acrylate, triacryl formal, and triallyl isocyanulate. As the crosslinking mode, non-crosslinking is preferable, but partial crosslinking to an extent not impairing the properties as a thermoplastic resin may also be used.

Examples of the liquid for generating a gas by the vaporization due to the above heat are liquids such as hydrocarbons, e.g., n-pentane, isopentane, neopentane, butane, isobutane, hexane, and petroleum ether or chlorinated hydrocarbons such as methyl chloride, methylene chloride, dichloroethylene, trichloroethane and trichloroethylene.

The microcapsule-shaped bubbles formed by the compounding of the thermally expansible microcapsules and the microcapsule-shaped bubbles obtained by compounding the foaming agent-containing resin are substantially the same in properties and effects, but the latter are characterized by larger bubbles than the former. The distribution of size of the microcapsules obtained by the combined use of the both components further improves the effect of elimination of the micro film (or layer) of water between the rubber and ice. Thus, a synergistic effect can be obtained by the combined use of the thermally expansible microcapsules and the foaming agent-containing resin.

In a preferable embodiment of the present invention, 0.5 to 20 parts by weight, preferably 3 to 10 parts by weight, of expansible graphite is added to 100 parts by weight of the diene rubber, in addition to the foaming agent-containing resin or the foaming agent-containing resin and the thermally expansible microcapsules. If the compounding amount is too small, the desired further improvement of the effect is difficult to be obtained, while if too large, it is not preferable because the mechanical strength of the vulcanized rubber is decreased. The expansible graphite is preferably a powder substance having a particle size of 30 to 600 μm, more preferably 100 to 300 μm, which encapsulates a substance capable of vaporizing by heat between the layers. It preferably expands due to the heat at the time of vulcanization and becomes expanded graphite.

The expansible graphite usable in the present invention may be those known in the past. For example, a crystalline compound maintaining the lamellar structure of carbon obtained by treating natural flake graphite, thermally decomposed graphite, kish graphite, etc. with an inorganic acid such as concentrated sulfuric acid or nitric acid etc. and a strong oxidizing agent such as concentrated nitric acid, perchloric acid salt, permanganate salt, or bichromate salt etc. to produce a graphite interlamellar compound may be mentioned. Further, the acid-treated expansible graphite is preferably neutralized with a basic compound for use. Here, as the basic compound, for example, ammonia, an alkali metal compound, an alkali earth metal compound, an aliphatic lower amine, etc. may be mentioned. Examples of the aliphatic lower amines are alkylamines such as monomethylamine, dimethylamine, trimethylamine, ethylamine, propylamine, butylamine. Examples of the alkali metal compounds or alkali earth metal compounds are hydroxides, oxides (including double oxides and complex oxides), carbonates, hydrogencarbonates (bicarbonates) or organic acid salts of gallium, sodium, calcium, barium, magnesium, etc. Examples of organic acid salts, are formates, acetates, propionates, butyrates, oxalates, malonates, succinates, tartarates or citrates.

The expansible graphite has the structure of sheets formed from carbon atoms stacked in layers and can be made to expand due to the vaporization of the substance between the layers. Since the material is hard, a decrease in the quality due to the mixing does not easily occur. Further, since this grouphite expands irreversibly at a constant temperature, it becomes easy to form foreign matter accompanying the voids inside the rubber matrix. The tread part of a tire using such a rubber suitably forms surface roughness at the time of abrasion. This efficiently removes the film (or micro layer) of water on the surface and improves the frictional force on the ice. On the other hand, expansible graphite has a skeletal structure composed of carbon atoms, and therefore has a good affinity with the rubber matrix having unpolar nature or carbon black. There is the advantage that, even if blended and added to rubber, the abrasion resistance of the vulcanized rubber is not decreased.

The average glass transition temperature of the diene rubber usable in the present invention is not more than −55° C., preferably −90° C. to −60° C. (that is, use for winter tires).

The diene rubbers usable in the present invention include any diene rubber conventionally used for tires in the past such as, for example, natural rubber (NR), polyisoprene rubber (IR), various styrene-butadiene copolymer rubbers (SBR), various polybutadiene rubbers (BR), acrylonitrile-butadiene copolymer rubber, etc. These rubbers may be used alone or in any combination thereof.

The rubber composition of the present invention may contain, as a rubber filler, any carbon black generally used in rubber compositions. Further, it is also possible to use carbon black surface treated with silica. Further, it is also possible to use silica. The amount of the carbon black is 20 to 80 parts by weight, preferably 30 to 60 parts by weight, based upon 100 parts by weight of the total rubber component. If the amount is too small, the rubber cannot be sufficiently reinforced and, for example, the abrasion resistance deteriorates. Conversely, if too large, it is not preferable because the hardness becomes too high or the processability is decreased. Further, 0 to 50 parts by weight of precipitated silica is added to 100 parts by weight of the rubber component. The silica need not be used, but when used, it should be used in an amount in a range where the tan δ values at various temperatures can be designed to be adequate for the balance of wet skid resistance and rolling resistance. If the amount of silica is too large, the electrical conductivity is decreased or the cohesive power of the reinforcing agent becomes strong and the dispersion during mixing becomes insufficient.

The carbon black usable in the present invention has a nitrogen specific absorption area ($N_2SA$) of at least 70 $m^2/g$, preferably 80 to 200 $m^2/g$, and a dibutyl phthalate oil absorption amount (DBP) of at least 105 ml/100 g, more preferably 110 to 150 ml/100 g.

According to the present invention, by compounding the above foaming agent-containing resin into a diene rubber, then mixing and extruding the mixture under conditions of not more than the decomposition temperature of the chemical foaming agent, and heating to expand and foam the mixture at the vulcanization step under a temperature condition of at least the decomposition temperature of the foaming agent, it is possible to form microcapsule-shaped bubbles coated with a resin to be dispersed in the rubber, whereby a rubber for a tire tread can be produced.

The decomposition temperature of the chemical foaming agent contained in the foaming agent-containing resin used in the present invention is 120 to 180° C., preferably 140 to 160° C. If the temperature is too low, the rubber will expand during the mixing and extrusion steps and the size stability during processing will be impaired. Conversely, if too high, it will not be possible to form resin-coated bubbles having a sufficient size during the vulcanization of the rubber. Note that, if the decomposition temperature of the chemical foaming agent is too high, it is possible to adjust the decomposition temperature to 120 to 180° C. by the combined use with a foaming assistant such as urea. A foaming assistant is available as, for example "Cellpaste" from Eiwa Chemical Co. (Japan).

The chemical foaming agent usable in the present invention may be at least one chemical foaming agent selected from an azo compound (ADCA), nitroso compound (DPT), hydrazine derivative (OBSH), azo compound (Ba/AC), and bicarbonate ($NaHCO_3$). Specifically, azodicarbonamide (ADCA), N,N-dinitrosopentanemethylenetetramin (DPT), 4,4'-oxybis(benzenesulfonylhydrazide) (OBSH), hydrazodicarbonamide (HDCA), barium azodicarboxylate (Ba/AC), and sodium hydrogencarbonate ($NaHCO_3$) may be mentioned. These are commercially available as "Vinyfor" (ADCA), "Cellular" (DPT), "Neocellborn" (OBSH), "Excellar" (DPT/ADCA), "Spancell" (ADCA/OBSH), "Cellborn" ($NaHCO_3$), etc. from Eiwa Chemical Co. (Japan).

The resin usable in the present invention has a composition comprising a polyolefin as a main component at a content of at least 75% by weight, preferably at least 85% by weight. The resin usable in the present invention may be preferably those not having any double bonds remaining in the main chain of the molecule, so as to prevent co-crosslinking with a diene rubber. If the content of the polyolefin is low, it is not preferable because the polyolefin is liable to crosslink with the rubber. The polyolefin used may be at least one type selected from polyethylene, polypropylene, poly-4-methylpentene-1, polybutylene-1, etc. These may also be used as any mixtures. Their copolymers may also be used.

The particle size of the foaming agent-containing resin used in the present invention is preferably 10 to 200 $\mu$m. If the size is smaller than this, sufficiently large microroughness cannot be formed on the rubber surface. If too large, the decrease in the mechanical strength of the rubber becomes remarkable.

The microcapsule-shaped bubbles formed in the vulcanized rubber according to the present invention are spherical, but the foaming agent-containing resin does not have to be spherically shaped at the stage of the raw material.

EXAMPLES

The present invention will now be explained further by Examples and Comparative Examples, but the scope of the present invention is by no means limited to these Examples.

Comparative Examples 1 to 3 and Examples 1 to 3

Preparation of Samples

A 1.7 liter internal Banbury mixer was used to mix the rubber, carbon black, and other compounding agents in the formulations shown in Table I (parts by weight) for 5 minutes, the rubber was discharged from the Banbury mixer and cooled to room temperature, then the same Banbury mixer was used to blend and mix the vulcanization accelerator, sulfur, thermally expansible microcapsules, chemical foaming agent, foaming agent-containing resin, and expansible graphite.

TABLE I

| | Comp. Example | | | Example | | |
|---|---|---|---|---|---|---|
| | 1 | 2 | 3 | 1 | 2 | 3 |
| Formulation (parts by weight) | | | | | | |
| RSS #3 | 50 | 50 | 50 | 50 | 50 | 50 |
| Nipol 1220 | 50 | 50 | 50 | 50 | 50 | 50 |
| Shoblack N220 | 55 | 55 | 55 | 55 | 55 | 55 |
| Santoflex 6PPD | 1 | 1 | 1 | 1 | 1 | 1 |
| Zinc Oxide No. 3 | 3 | 3 | 3 | 3 | 3 | 3 |
| Stearic acid | 1 | 1 | 1 | 1 | 1 | 1 |
| Aromatic oil | 30 | 30 | 30 | 30 | 30 | 30 |
| Santocure NS | 1.5 | 1.5 | 1.5 | 1.5 | 1.5 | 1.5 |
| Sulfur | 2 | 2 | 2 | 2 | 2 | 2 |
| Microspheres F100D | — | 5 | — | — | 5 | — |
| Cellular D | — | — | 2.5 | — | — | — |
| Cellpaste 101 | — | — | 2 | — | — | — |
| Cellpowder F50 | — | — | — | 5 | 5 | 5 |
| GRAF Guard 160-80N | — | — | — | — | — | 5 |
| Evaluation of Physical Properties* | | | | | | |
| Rubber hardness | 95 | 100 | 90 | 99 | 105 | 100 |
| expansion ratio of vulcanized rubber (170° C. for 15 min) | — | 100 | 110 | 115 | 122 | 120 |

TABLE I-continued

|  | Comp. Example | | | Example | | |
| --- | --- | --- | --- | --- | --- | --- |
|  | 1 | 2 | 3 | 1 | 2 | 3 |
| Frictional force on ice (index) (−1.5° C.) (plane 0.5 mm from rubber surface) | 87 | 100 | 94 | 105 | 121 | 124 |
| Frictional force on ice (index) (−1.5° C.) (plane 2 mm from rubber surface) | 85 | 100 | 104 | 110 | 127 | 125 |

*The larger the figure, the higher the hardness, the higher the expansion ratio, and the higher the frictional force on ice exhibited.
Notes to Table I
RSS #3: natural rubber (Ribbed Smoked Sheet No. 3)
Nipol 1220: polybutadiene rubber made by Nippon Zeon K.K., glass transition temperature = −101° C.
Shoblack N220: carbon black made by Showa Cabot K.K.,
$N_2SA$: 111 $m^2/g$,
DBP oil absorption: 111 ml/100 g
Santoflex 6PPD: antioxidant made by Flexsis
Zinc Oxide No. 3: zinc oxide made by Seido Chemical K.K. Industry
Stearic acid: made by Nippon Oil and Fat Company (K.K.)
Aromatic oil: made by Fuji Kosan K.K.
Santocure NS: vulcanization accelerator TBBS made by Flexsis
Microsphere F100D: heat expansible microcapsules made by Matsumoto Yushi K.K.
Cellular D: DPT-based foaming agent made by Eiwa Chemical K.K.
Cellpaste 101: urea-based foaming assistant made by Eiwa Chemical K.K.
Cellpowder F50: resin containing chemical foaming agent (OBSH 40 to 50% by weight) made by Eiwa Chemical K.K.
GRAF Guard 160-80N: expansible graphite made by UCAR Graphtech (expansion starting temperature 160° C.)

Evaluation of Physical Properties

Each compound was vulcanized in a columnar mold having a diameter of 3 cm and a height of 1.5 cm at 170° C. for 15 minutes. After the vulcanization, the rubber was sufficiently cooled in water, left in a room at 25° C. for 6 hours, then a horizontal surface of the rubber was measured for hardness. Next, the center part of the rubber was cut out and measured for specific gravity. The expansion ratio was calculated as the rate of decrease in the specific gravity of the vulcanized rubber based upon the calculated specific gravity.

A rubber sheet of a thickness of 5 mm, a length of 330 mm, and a width of 60 mm composed of each vulcanized compound was sliced to give rubber pieces having thicknesses of 2 mm from positions of 0.5 mm and 2 mm depth from the surface. These test pieces cut out to a width of 20 mm were adhered to a flattened columnar rubber base and measured for coefficient of friction on ice by an inside drum type ice friction tester. The measurement temperature was −1.5° C., the load 0.3 MPa, and the drum rotational speed 25 km/hr. Note that the 0.5 mm plane from the surface simulates the tread surface in the early period of use of a tire, while the 2 mm plane from the surface simulates it in the middle period of use of the tire.

According to the present invention, when if blending into a diene-based rubber a foaming agent-containing resin having a resin ingredient mainly composed of a polyolefin resin, which does not have co-crosslinkability with rubber and foam in the rubber during vulcanization, microcapsule-shaped bubbles coated with a resin layer are formed. Since there is a resin layer around the bubbles, decrease in the rigidity of the rubber after vulcanization is small. Further, the microcapsule-shaped bubbles formed also have the effect of suppressing poor foaming due to escape of gas at the time of vulcanization. When using this composition for the tread part of a tire for ice- and snow-covered road surfaces, a high frictional force on ice can be obtained from the initial period of use.

What is claimed is:

1. A rubber composition comprising (i) 100 parts by weight of a diene rubber and (ii) 0.5 to 20 parts by weight of a foaming agent-containing resin containing 5 to 65% by weight of a chemical foaming agent, said resin being mainly composed of a polyolefin resin which is not co-crosslinkable with the diene rubber, wherein the rubber composition is structured having microcapsule-shaped bubbles coated with a resin layer after vulcanization of the rubber.

2. A rubber composition as claimed in claim 1, further comprising (iii) 0.5 to 20 parts by weight, based upon 100 parts by weight of the diene rubber, of a thermally expansible microcapsule composed of a gas-filled thermally expansible thermoplastic resin.

3. A rubber composition as claimed in claim 1 or 2, further comprising (iv) 0.5 to 20 parts by weight, based upon 100 parts by weight of the diene rubber, of expandable graphite.

4. A rubber composition as claimed in claim 1 or 2, wherein an average glass transition temperature of the diene rubber is −55° C. or less.

5. A process for producing a rubber composition comprising the steps of:

compounding the foaming agent-containing resin according to claim 1 into a diene rubber;

mixing and extruding the mixture under a temperature condition lower than a decomposition temperature of a chemical foaming agent; and heating the mixture at a vulcanization step under a temperature condition of at least the decomposition temperature of the chemical foaming agent to be expanded and foamed, whereby the microcapsule-shaped bubbles coated with a resin layer are dispersed in the rubber.

* * * * *